US008943425B2

(12) United States Patent
Wickramasuriya et al.

(10) Patent No.: US 8,943,425 B2
(45) Date of Patent: Jan. 27, 2015

(54) METHOD AND APPARATUS FOR CONTEXT-AWARE DELIVERY OF INFORMATIONAL CONTENT ON AMBIENT DISPLAYS

(75) Inventors: Jehan Wickramasuriya, St. Charles, IL (US); Craig Janssen, St. Charles, IL (US); Nitya Narasimhan, Lake Zurich, IL (US); Michael Pearce, Barrington, IL (US); Daniel Stewart, Hoffman Estates, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 1084 days.

(21) Appl. No.: 11/928,551

(22) Filed: Oct. 30, 2007

(65) Prior Publication Data

US 2009/0113346 A1 Apr. 30, 2009

(51) Int. Cl.
*G06F 3/048* (2013.01)
*H04M 1/725* (2006.01)
*G06F 3/0481* (2013.01)
*G06F 9/44* (2006.01)
*G06F 17/30* (2006.01)

(52) U.S. Cl.
CPC ......... *H04M 1/72544* (2013.01); *G06F 3/0481* (2013.01); *G06F 9/4446* (2013.01); *G06F 17/30867* (2013.01); *H04M 1/72569* (2013.01)
USPC ............ 715/764; 715/765; 715/766; 715/774

(58) Field of Classification Search
USPC ................................... 715/764, 765, 766, 774
See application file for complete search history.

(56) References Cited

U.S. PATENT DOCUMENTS

| 5,907,502 | A | 5/1999 | Kim |
| 6,498,955 | B1 * | 12/2002 | McCarthy et al. ................ 700/1 |
| 6,577,329 | B1 * | 6/2003 | Flickner et al. ............... 715/774 |
| 6,714,778 | B2 | 3/2004 | Nykanen et al. |
| 6,856,330 | B1 * | 2/2005 | Chew et al. ................... 715/745 |

(Continued)

FOREIGN PATENT DOCUMENTS

| CN | 101110263 A | 1/2008 |
| EP | 1 667 013 A2 | 6/2006 |
| WO | WO-2004/049208 A1 | 6/2004 |

OTHER PUBLICATIONS

Motorola, Inc Personalization Reducing complexity for an easier, more intuitive user experience Oct. 2006 pp. 1-5.*

(Continued)

*Primary Examiner* — Andrea Long
(74) *Attorney, Agent, or Firm* — Marshall, Gerstein & Borun LLP (57) ABSTRACT

A method and apparatus is disclosed whereby the context of user activity can be used to tailor the ambient information system. The method and apparatus use both short-term context such as recent activity and long-term context such as historical patterns to highlight specific content on channels or widgets that are likely to be of most immediate interest to the user. This contextual information provided by the framework can also be used to make intelligent decisions about how to tailor the user experience after a user has interacted with the item in question. Additionally, context information accumulated on one device such as a mobile phone can be broadcasted to other devices to influence the ambient information display application on a second device such as a desktop based on enabling remote access to the local context repository.

15 Claims, 9 Drawing Sheets

(56) References Cited

U.S. PATENT DOCUMENTS

| | | | |
|---|---|---|---|
| 7,599,232 B2 | 10/2009 | Miyata | |
| 8,185,839 B2* | 5/2012 | Jalon et al. | 715/769 |
| 2003/0067489 A1* | 4/2003 | Candy Wong et al. | 345/765 |
| 2005/0039135 A1* | 2/2005 | Othmer et al. | 715/774 |
| 2005/0039136 A1* | 2/2005 | Othmer | 715/774 |
| 2005/0154996 A1* | 7/2005 | Othmer | 715/774 |
| 2005/0243019 A1 | 11/2005 | Fuller et al. | |
| 2005/0268234 A1 | 12/2005 | Rossi, Jr. et al. | |
| 2005/0289180 A1 | 12/2005 | Pabla et al. | |
| 2006/0053392 A1 | 3/2006 | Salmimaa et al. | |
| 2006/0089160 A1 | 4/2006 | Othmer | |
| 2006/0150106 A1* | 7/2006 | Jokinen et al. | 715/744 |
| 2006/0277481 A1* | 12/2006 | Forstall et al. | 715/764 |
| 2007/0035661 A1* | 2/2007 | Resner et al. | 348/468 |
| 2007/0067738 A1* | 3/2007 | Flynt et al. | 715/810 |
| 2007/0067852 A1* | 3/2007 | James | 726/28 |
| 2007/0101297 A1 | 5/2007 | Forstall et al. | |
| 2007/0162850 A1* | 7/2007 | Adler et al. | 715/700 |
| 2008/0168367 A1* | 7/2008 | Chaudhri et al. | 715/764 |

OTHER PUBLICATIONS

Ebling, M. R. 2006. HotMobile 2006: workshop on mobile computing systems and applications overview of workshop. SIGMOBILE Mob. Comput. Commun. Rev. 10, (Jul. 3, 2006), 70-78.*

Apple Dashboard Instant access to widgets. 2006 8 pages.*

Maria Langer Mac OS X 10.5 Leopard: Visual QuickStart Guide Oct. 25, 2007 pp. 1, 16, 25, 29 and 65-66.*

Schmidt, "Interactive Context-Aware Systems Interaction," IOS Press, 2005, pp. 163-164, 168, 173.

Neely, et al., "Assessing the Suitability of Context information for Ambient Display," W-9 Ambient Information Systems, Pervasive '07 Workshop: w-9 Ambient Information Systems, Toronto, Ontario, Canada, May 13, 2007, 4 pages.

Seon Kyoung Han, "PCT International Search Report and Written Opinion," WIPO, ISA/KR, Korean Intellectual Property Office, Daejeon, Republic of Korea, Mar. 27, 2009, PCT/USS2008/078257.

J. Wickramasuriya et. al.; "Interstitial Interfaces for Mobile Media"; Pervasive Platforms & Architectures Lab Applications Research, Motorola Labs, Schaumburg, IL, Pervasive 2007 Workshop: W9—Ambient Information Systems, May 13, 2007; Toronto, Ontario, Canada.

Neely et. al.; "Assessing the Suitability of Context Information for Ambient Display"; Systems Research Group, University College, Dublin, Ireland, Pervasive 2007 Workshop: W9—Ambient Information Systems, May 13, 2007; Toronto, Ontario, Canada.

Janssen et. al.; "AppBus: Mobile Device Application Collaboration via Short Term Memory"; Motorola Labs, Schaumburg, IL, Journal of Software, vol. 1, No. 2, Aug. 2006, pp. 41-47.

Siewiorek et. al; "SenSay :: A Context-Aware Mobile Phone"; Human Computer Interaction Institute and Institute for Complex Engineered Systems, Carnegie Mellon University, Pittsburgh, PA, Proceedings of the 7th IEEE International Symposium on Wearable Computers (2003).

Duri et al., "An Approach to Providing a Seamless End-User Experience for Location Aware Applications"; Proceedings of the 1st International Workshop on Mobile Commerce; Rome, Italy; WMC 2001; pp. 20-25.

European Patent Office, "Extended Search Report" for European Patent Application No. 08845597.7 dated Apr. 8, 2013, 8 pages.

The State Intellectual Property Office of the People's Republic of China, "Notification of the Fourth Office Action" for Chinese Patent Application No. 200880113889.7 dated Jul. 3, 2013, 9 pages.

* cited by examiner

METHOD AND APPARATUS FOR CONTEXT-AWARE DELIVERY OF INFORMATIONAL CONTENT ON AMBIENT DISPLAYS

BACKGROUND OF THE INVENTION

1. Field of the Invention

The invention relates to a mechanism whereby the context of user activity can be used to tailor the ambient information system.

2. Introduction

Mobile information delivery applications such as SCREEN3 and widgets are gaining popularity for their ability to display ambient information to a user at times when his device is idle, that is when no user-interactive application is running. These applications are useful not only for delivering informational content to the user, example news-feeds, but also for providing regular information updates about the user's community, example music and discussion groups, or for delivering advertisements based on the user's defined interests. In all cases, the real value to the content provider occurs only when the user views a particular item and clicks through to receive more information and download richer content.

Unfortunately, mobile devices have limited display real estate for showing informational content to the user. As a result, applications resort to one of two approaches—a serial consumption experience where information items are displayed and consumed in sequence, and a parallel consumption model where information items are displayed concurrently and consumed simultaneously. Serial consumption usually involves scrolling models—all items are displayed in a carousel format looping sequentially through all available items with only a few items visible to the user at any given point in time. On the other hand, parallel consumption models handle the scarcity of display real estate by placing the decision-making burden on the user. Users must decide which widgets to display in order to make best use of their limited display.

In either case, items must now compete for face-time with the user, given only limited opportunities to grab the user's attention. This leads to interesting situations where item of no interest are shown at an opportune time and items of interest may be shown at un-opportune time. Further, items may be displayed at the wrong time and in the wrong context for the user to properly interact with the item. For example, the user may be interested in knowing if any of his friends have beaten his high score in Tetris (ambient information on a gaming community channel or a gaming presence widget). However, this information is of no use to a user if it is displayed at a time when the user is in a meeting. Instead, if the information was shown to the user in his free time (on his rail commute home), this provides an opportunity for him to respond by launching Tetris to try and reclaim his high score ranking.

Thus, the basic problem is that of information overload with limited opportunities for information display to the user. Note that while we have defined the problem with focus on mobile devices, a similar issue also applies to ambient information systems for desktops such as Apple Dashboard and Yahoo Konfabulator. Users often install more widgets than are "active" on the display at any given time—furthermore, they can also elect to "hide" some subset of active displays in order to reduce information overload and desktop clutter. The key difference is that desktop displays are passive awareness interfaces always visible in the user's periphery while mobile displays are interstitial awareness interfaces only viewed in between user activities—hence desktop systems provide more opportunities to attract the user's attention.

For the reasons stated above, and for other reasons stated below which will become apparent to those skilled in the art upon reading and understanding the present specification, there is a need in the art for mechanism that can display the right information to the user at the right time to achieve impact.

SUMMARY OF THE INVENTION

A method and apparatus is disclosed whereby the context of user activity can be used to tailor the ambient information system. The method and apparatus use both short-term context such as recent activity and long-term context such as historical patterns to highlight specific content on channels or widgets that are likely to be of most immediate interest to the user. This contextual information provided by the framework can also be used to make intelligent decisions about how to tailor the user experience after a user has interacted with the item in question. Additionally, context information accumulated on one device such as a mobile phone can be broadcasted to other devices to influence the ambient information display application on a second device such as a desktop based on enabling remote access to the local context repository.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The invention comprises a variety of embodiments, such as a method and apparatus and other embodiments that relate to the basic concepts of the invention.

Below are definitions which will be used throughout in the discussion:

An "ambient display system", "ambient information display" (AID), "SCREEN3", "widget", "ambient information system", or "dashboard" deliver non-critical in-formation to a user in a passive manner. Users perceive this information in their periphery, gaining an overview of the information without requiring the shifting of focus from their other activity. They may gain additional insight by explicitly focusing on the display and possibly interacting with it.

An "interest" may be something that concerns, involves, draws the attention of, or arouses the curiosity of a person.

A "user interest" may be something that concerns, involves, draws the attention of, or arouses the curiosity of a particular user associated with a mobile communications device.

An "interest metric" may be a set of one or more pieces of data, including at least one quantitative element, representative of a level of importance attached to a user interest.

A "user interest metric" may be an interest metric associated with a particular user.

A "user interest profile" may be a collection of data which includes the user interest metrics associated with a particular user.

"Interests" and "user interests" may be found in the real world. "Interest metrics," "user interest metrics," and "user interest profiles" are found within our system and form a part of the model of the real-world concepts.

A "geographical area" may be a bounded region of the planet. It may be bounded by a variety of means known in the art. For example: a range of coordinates, such as latitude, longitude, and altitude. Another example is known as metes and bounds whereby a starting point is identified and a path enclosing the geographical area is described. Another example is defining an area by proximity: The area within 10 miles of a user, or the area within 500 meters of Buckingham Fountain in Chicago. Another example is by reference: The 15th floor of the Sears Tower, the Atrium of the Motorola Innovation Center. All of these and more are ways of specifying a geographical area.

The term "area" may be used interchangeably with "geographical area."

A "zone" may be a data construct within the system associated with one interest metric and one geographical area pertinent to that interest metric.

"Geographical areas" may exist in the real world and as such a user may visit them from time to time. Zones may exist within the system and the user can not visit a zone. There may be many interests associated with an area, but there is preferably one and only one interest metric associated with a zone. Many zones may exist corresponding to the exact same geographical area. Many zones may exist corresponding to approximately the same geographical area, having some of these zones defining the area slightly differently than others, as is best suited to the purposes of their associated interest metrics.

The term "context" as used herein, means any data than can be used to derive information about the situation of an entity. An entity is a person, place, or object that is considered relevant to the interaction between a user and an application or device, including the user and applications within the device themselves.

The embodiments described herein overcome the limitations of the prior art by developing content-aware ambient display systems for each device user without need for an actual user response to a presented content or other item. A context aware framework will help target content so that users are more likely to be presented with content that relate to their interests and activities. This method will increase the probability that the user will interact with the ambient display systems, respond to them, visit the advertised business locations, and purchase the advertised products or services. Thus, the method will increase the impact of mobile advertising and reduce negative user response to irrelevant or intrusive content.

Figure 1:
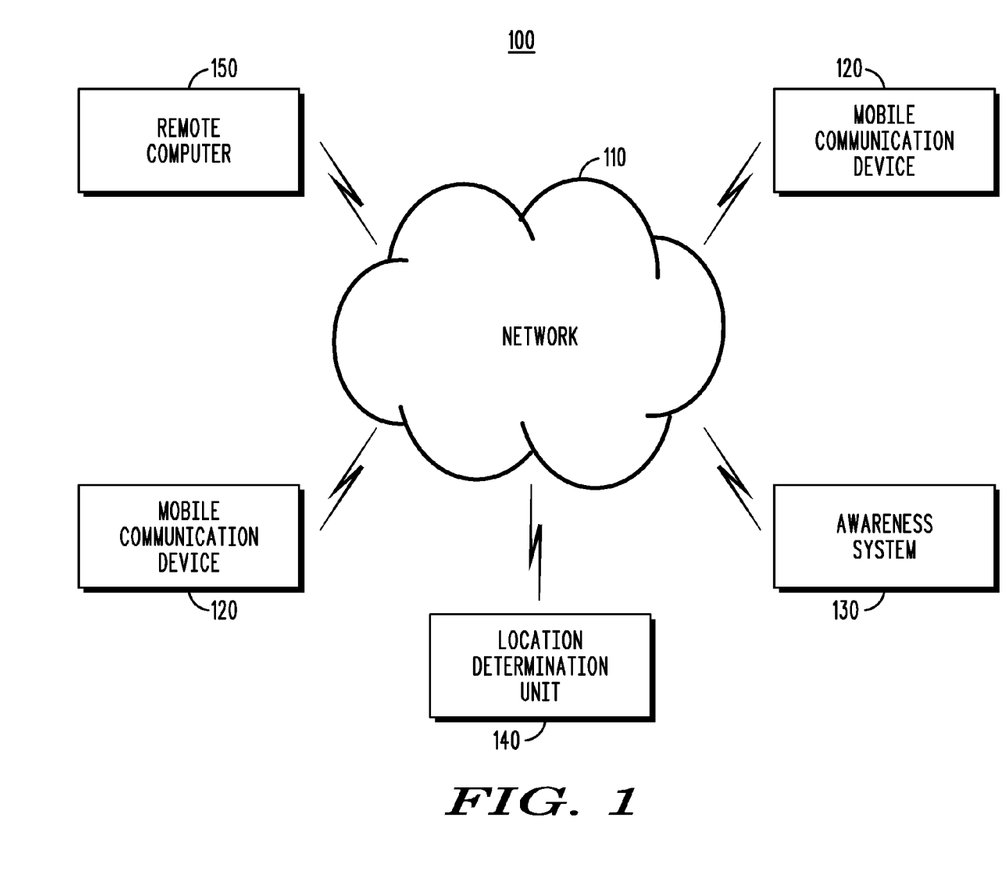
FIG. 1 illustrates an exemplary diagram of communications network environment in accordance with a possible embodiment of the invention.

FIG. 1 illustrates an exemplary diagram of a mobile communications network environment 100 in accordance with a possible embodiment of the invention. In particular, the mobile communication network environment 100 may include a plurality of mobile communication devices 120, awareness systems 130, remote computer 150, and a location determination unit 140 connected via network 110.

This invention concerns creating context-aware ambient display systems based on user context.

The mobile communication device 120 may be a portable MP3 player, satellite radio receiver, AM/FM radio receiver, satellite television, portable music player, portable computer, wireless radio, wireless telephone, portable digital video recorder, cellular telephone, mobile telephone, personal digital assistant PDA), or combinations of the above, for example. Remote computer 150 includes an operating system (not shown) that is stored in a computer-accessible media RAM, ROM, and mass storage device, and is executed by the processor. Examples of operating systems include Microsoft Windows®, Apple MacOS®, Linux®, UNIX®. Examples are not limited to any particular operating system, however, and the construction and use of such operating systems are well known within the art. Embodiments of remote computer 150 are not limited to any type of computer. In varying embodiments, remote computer 150 comprises a PC-compatible computer, a MacOS®-compatible computer, a Linux®-compatible computer, or a UNIX®-compatible computer. The construction and operation of such computers are well known within the art.

The location determination unit 140 is a device external to the mobile communication devices 120 that may record itself or assist the mobile communication device 120 in determining its location. For example, the location determination unit 140 may operate in conjunction with a camera, sensor or other remote device that may recognize the user and records (or assist in recording) the user's location. The information collected by the location determination unit 140 may be transmitted directly or through the communications network 110 to awareness system 130.

The mobile communications network environment 100 illustrated in FIG. 1 and the related discussion are intended to provide a brief, general description of a suitable computing environment in which the invention may be implemented. Although not required, the invention will be described, at least in part, in the general context of computer-executable instructions, such as program modules, being executed by the awareness system 130. Generally, program modules include routine programs, objects, components, data structures, etc. that perform particular tasks or implement particular abstract data types. Moreover, those skilled in the art will appreciate that other embodiments of the invention may be practiced in communication network environments with many types of communication equipment and computer system configurations which operate from batteries, including cellular network devices, mobile communication devices, portable computers, hand-held devices, portable multi-processor systems, microprocessor-based or programmable consumer electronics, and the like. The mobile communications device 120 is described further below in relation to FIG. 3.

Figure 2:
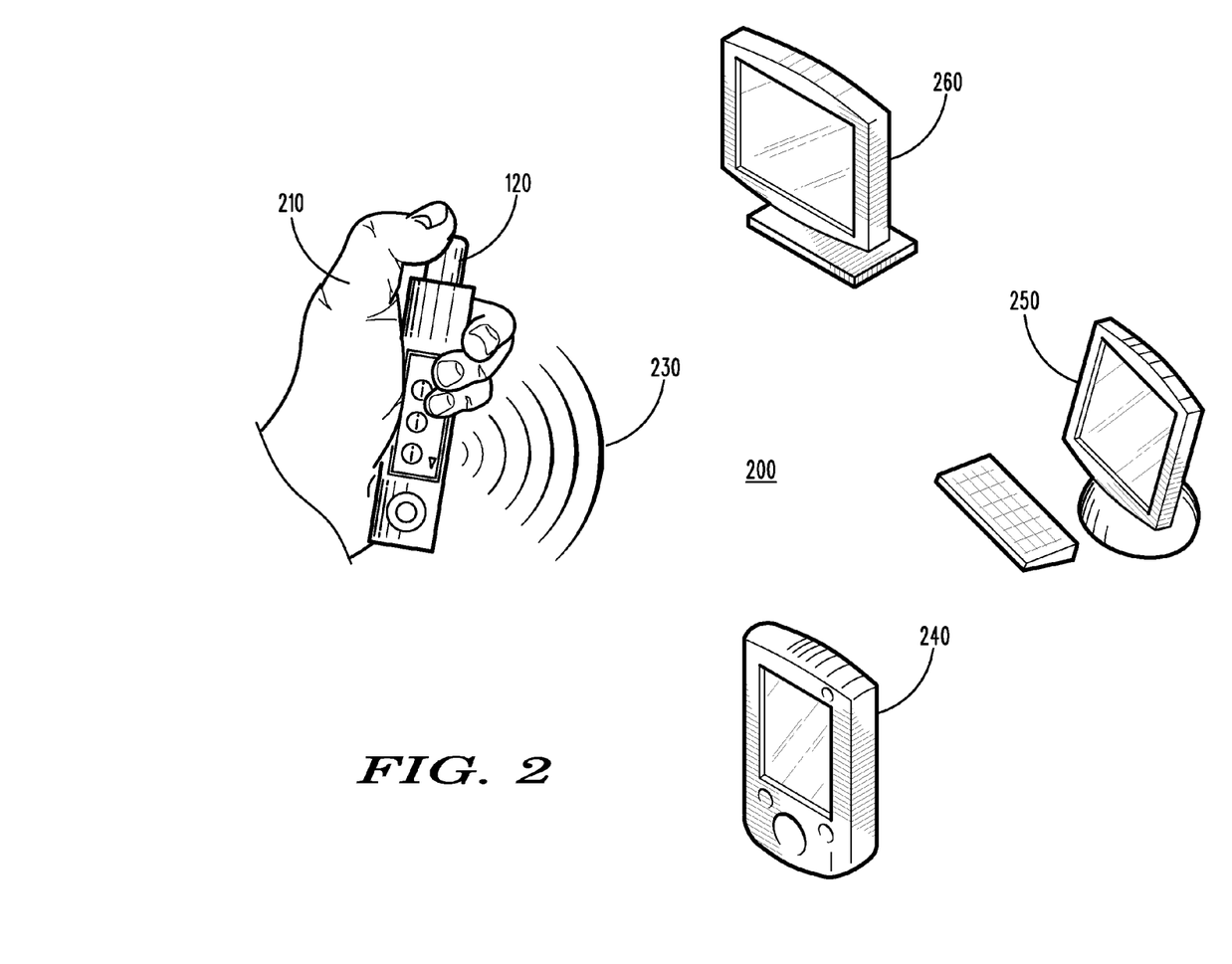
FIG. 2 illustrates broadcasting context information from one-to-many devices in accordance with a possible embodiment of the invention.

FIG. 2 illustrates the sharing of context information 200 between devices in accordance with a possible embodiment of the invention. A user 210 while interacting with at least one or more mobile device 120 encounters other devices that are within the control of user 210 or at least open to receiving the broadcasted signal 230 from user 210. The other devices can include personal assistance device or mobile device 240, desktop computer or desktop pc 250, digital picture frame, electronic device such as communication device 120, and entertainment device 260. Entertainment device 260 can be a set top box for receiving television signals, a television set without a set top box, a musical reproduction device, or a gaming system for playing video games.

Figure 3:
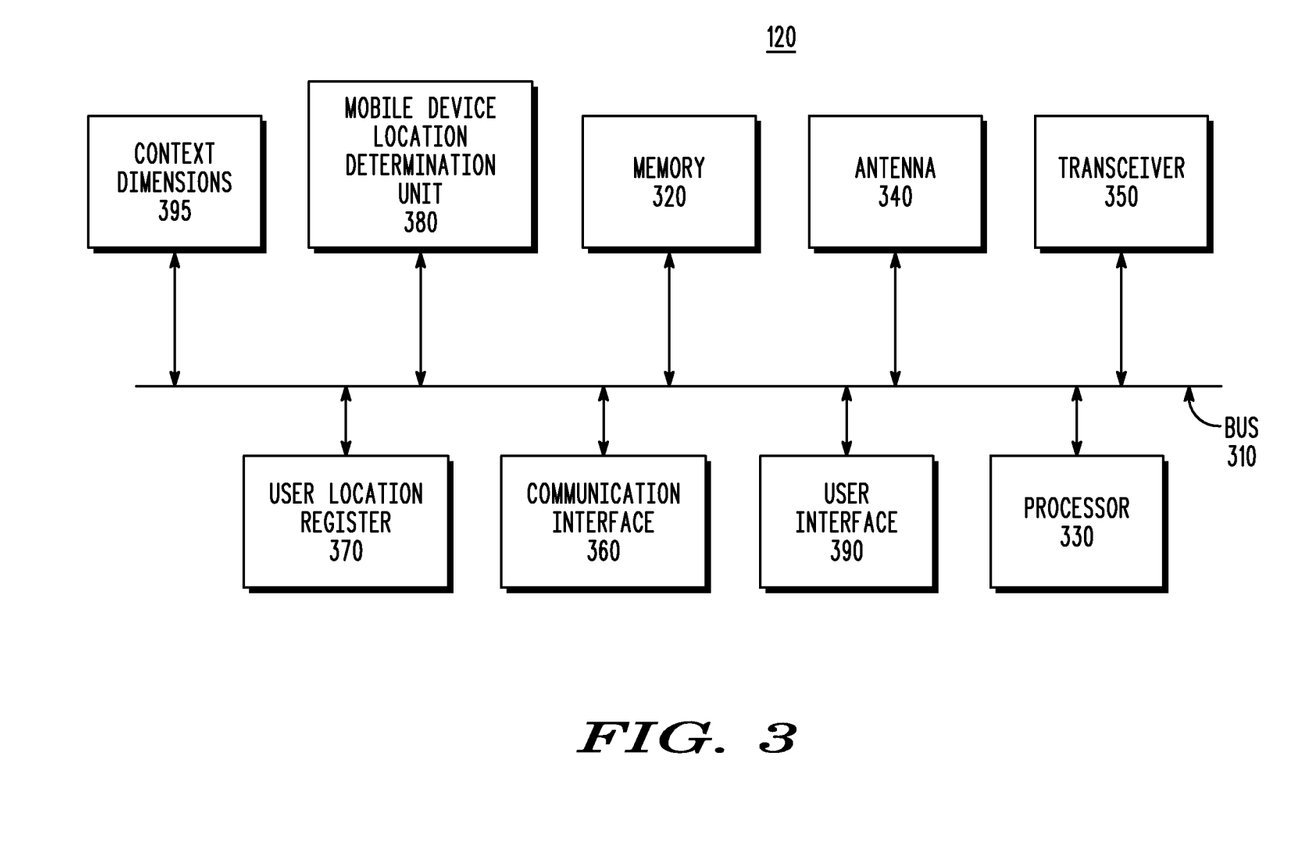
FIG. 3 illustrates a block diagram of an exemplary mobile communication device in accordance with a possible embodiment of the invention.

FIG. 3 illustrates a block diagram of an exemplary mobile communications device 120 in accordance with a possible embodiment of the invention. The mobile communications device 120 may include a bus 310, a processor 330, a memory 320, an antenna 340, a transceiver 350, a communication interface 360, a user location register 370, a mobile device location determination unit 380, and a user interface 390. Bus 310 may permit communication among the components of the mobile communication device 120.

Processor 330 may include at least one conventional processor or microprocessor that interprets and executes instructions. Memory 320 may be a random access memory (RAM) or another type of dynamic storage device that stores information and instructions for execution by processor 330. In varying embodiments, memory 320 is a magnetic medium, an electronic medium, or an optical medium. Memory 320 may also include a read-only memory (ROM) which may include a conventional ROM device or another type of static storage device that stores static information and instructions for processor 330. Memory 320 has executable instructions to create context-aware ambient display systems. The executable instructions is capable of directing processor 330 to perform selecting at least one of a multiplicity of ambient display systems given a current user context, and highlighting at least one of a multiplicity of content items for display on the selected ambient display systems given the current user context and device capability.

Transceiver 350 may include one or more transmitters and receivers. The transceiver 350 may include sufficient functionality to interface with any network or communications station and may be defined by hardware or software in any manner known to one of skill in the art. The processor 330 is cooperatively operable with the transceiver 350 to support operations within the communications network 110. The transceiver 350 transmits and receives transmissions via one or more of the antennae 340 in a manner known to those of skill in the art.

Communication interface 360 may include any mechanism that facilitates communication via the network 110. For example, communication interface 360 may include a modem. Alternatively, communication interface 360 may include other mechanisms for assisting the transceiver 350 in communicating with other devices and/or systems via wireless connections.

User interface 390 may include one or more conventional input mechanisms that permit a user to input information, communicate with the mobile communication device 120, and/or present information to the user, such as a an electronic display, ambient display, microphone, touchpad, keypad, keyboard, mouse, pen, stylus, voice recognition device, buttons, one or more speakers, etc. As shown the user interface 390, such as an ambient display or display, is coupled to processor 330 through Bus 310.

Context dimensions 395 ascertains data about the current state of the system, its users, and their surrounding environment such as location and time of day. Examples of such data are environmental conditions such as weather and temperature, user location, currents tasks being performed by the user through the device 120, goals that may be ascertain from a calendar unit or schedule for the user, and recent context history.

While the mobile communication device 120 is shown as an example, one of skill in the art may appreciate that any known or future-developed combination of location determination systems may be used to track the location of the user. The user location register 370 is used to store the locations of the user as determined by the mobile device location determination unit 380 via a global positioning system (GPS) device, for example.

For instance, in one possible manner to perform the user location tracking process, the mobile device location determination unit 380 may periodically record the location of the mobile communication device 120 and its user in the user location register 370, at various times. At predetermined times or when requested by the awareness system 130, a file containing the user's location/time information may be compressed and periodically uploaded to the awareness system 130. The file may then be deleted from the user's mobile communication device 120. To minimize network load, the user's location/time file and identity information may be uploaded during periods of reduced or idle network traffic, such as the middle of the night, for example.

The mobile communication device 120 may perform such functions in response to processor 330 and/or mobile device location determination unit 380 by executing sequences of instructions contained in a computer-readable medium, such as, for example, memory 320. Such instructions may be read into Memory 320 from another computer-readable medium, such as a storage device or from a separate device via communication interface 360.

Figure 4:
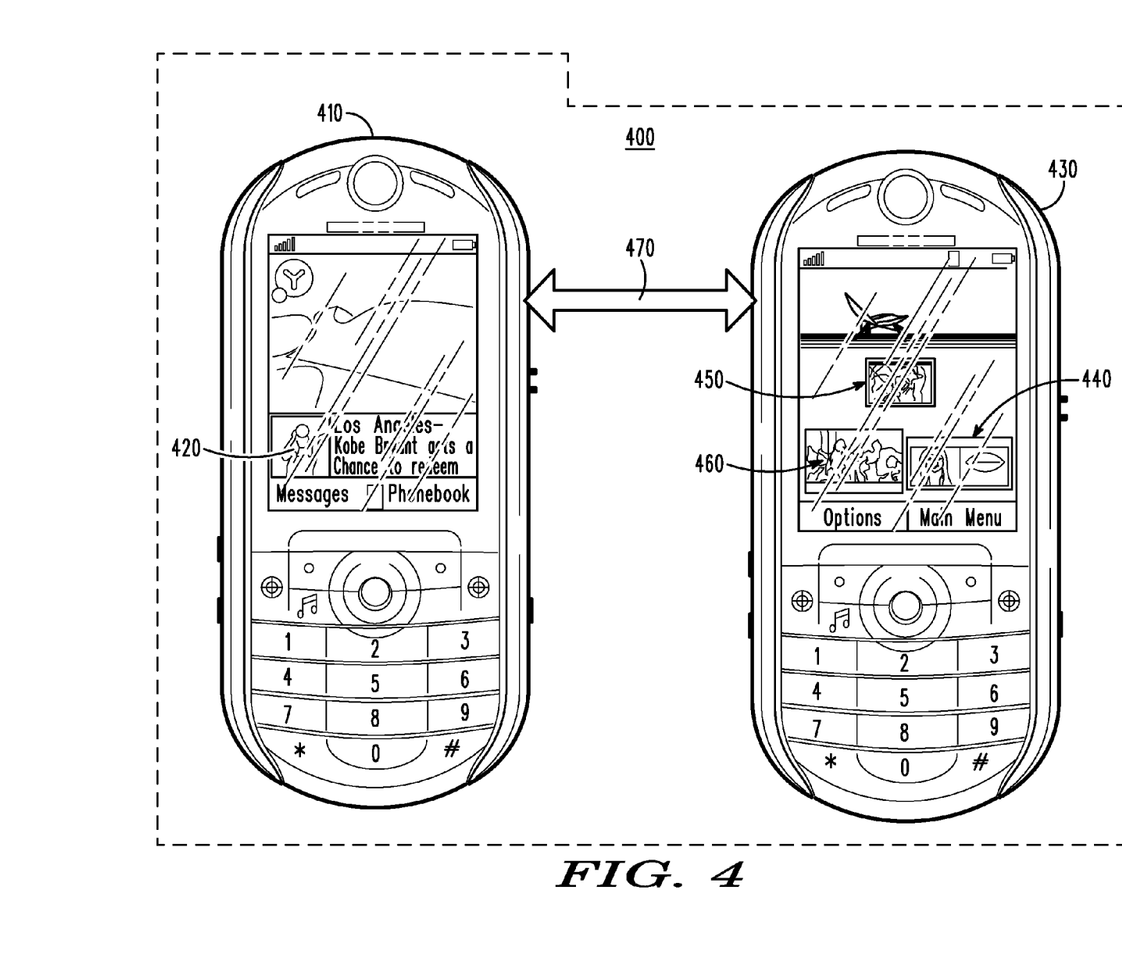
FIG. 4 illustrates mobile devices implementing serial consumption model and parallel consumption model in accordance with a possible embodiment of the invention.

FIG. 4 is representation of mobile devices 400 showing serial consumption model 420 and parallel consumption model 460.

The mobile devices 400 include a first mobile device 410, a serial consumption model 420 ambient display system with multiple channels, one canvas, and carousel, and broadcasting device 470 for sharing context information with other devices such as second mobile device 430. The second mobile device includes a parallel consumption model channel1 widget 440, a parallel consumption model channel2 widget 450, and parallel consumption model channel3 widget 460.

Figure 5:
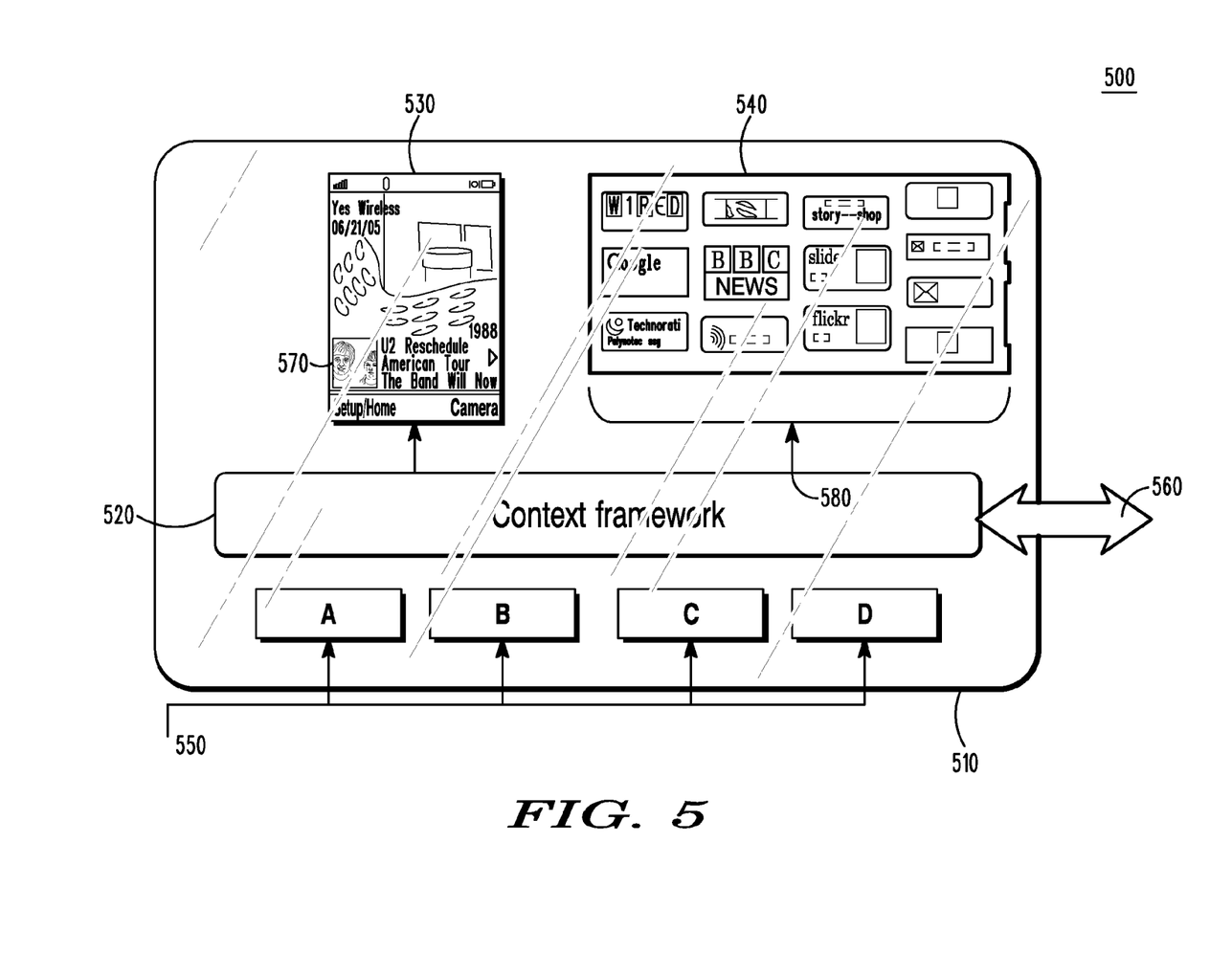
FIG. 5 illustrates a block diagram for implementing a serial or parallel consumption model in a mobile device in accordance with a possible embodiment of the invention.

FIG. 5 is a representation of the context framework 500 for context-aware ambient display systems in a mobile device 510. Mobile device 510 has the hardware components and software components of communication device 120 as described above in FIG. 3. The context framework 500 includes a mobile device 510, a context framework bus 520, a serial consumption model 530, a parallel consumption model 540, context sources 550, a context broadcasting vehicle 560, content selection (select/highlight) 570 for a serial consumption model, and content selection (hide/reveal) 580 for a parallel consumption model. As shown in content selection 570, highlighting for the serial consumption model is to position the current carousel pointer to a content channel or an item that is most relevant to the user context.

The context framework bus 520 on mobile phone 410 uses the gathered user context information 550 from sources A-D so as to select a multiplicity of ambient display systems such as serial consumption model 530 and parallel consumption model 540. The selected ambient display systems will display the highlighted specific content for the user to select for further interaction. The user context information 550 can be based on current user context or historical user context. User context information 550 is any data through which contextual information may be derived (e.g., user name and password, preferences, user's proximity to a context gathering device, documents, software version/status information, authorizations, keys, or any other information that may indicate a preference or authorization for access to data). Various models and algorithms can assist the context framework bus 520 to determine relevant or related information. Also, context information 550 can be obtained from a plurality of sources such as a calendar, detected application activities, detected application content, a log of previous activities, an explicit profile, a microphone and/or camera, face recognition technology, telephone or cell phone activity, and so forth. Such context can be employed to determine a user's current focus of attention or determine what types of information may be most likely to impact the user based upon the user's current task at hand. In operation, the context framework bus 520 dynamically generates or fetches the highlighted specific content according to a required further user input and contextual information. The context framework bus 520 basic principles of operation comprise inserted data in the form of data objects having base data and unlimited number of attributes. Any application can update the information in any data object regardless of ownership or initiating of the data object. The Context framework bus 520 may retrieve data objects on the basis of specific attributes. The retrieval and updating creates a share data container to enable applications to share relevant data with others without necessarily being aware of the identities, interfaces, or count of the interested recipient. The context framework bus 520 allows applications to received information about updated data objects or to limit information about only specific updated data objects. The context framework bus 520 organizes the data object based on relationships. Further, the context framework bus 520 maintains an index of data objects and when they were created and how often they are used by the application community. Those data objects that are beyond a certain period are purged from the index and can only be used by those applications that retain the data object. Data objects representing context sources 550 such as media player telephony, web browser, and gaming applications are processed by the context framework bus 520.

The context framework bus 520 facilitates an agreement between data producers (applications) and the data consumer (SCREEN3 or widget engine) on the attributes to be associated with shared information. Thus, a gaming application simply drops data on the context framework bus 520 with game-related information (type=game, status=start, title=chess, genre=strategy). The ambient display application (SCREEN3 or widget engine) can register to be notified of all data with a "type" attribute, and look at the value of this attribute to find relevant channels (or widgets) that correspond to it. The serial consumption model 530 (SCREEN3) or the parallel consumption model 540 (widget engine) application can register to be notified of specific context. The parallel consumption model 540 shows a concurrent display while the serial consumption model 530 has multiple channels. In the serial consumption model 530 the multiple channels or a subset of channels are carousel to the user for consumption. The current carousel for serial consumption model 530 is current carousel 570. It should be understood that the ambient display system can support at least one of serial consumption model, parallel consumption model, or serial consumption model and parallel consumption model. How the highlighted content items are shown to the user depends on whether a serial consumption model 530 or a parallel consumption model 540 is used at the ambient display system. For example, highlighted content items are setting the current carousel pointer to a particular item (more specifically a channel, item tuple) 570 for a serial consumption model, or revealing the right widget (transition from hidden state) 580 for the parallel consumption model. This context is also persisted such that if the current focus is on a different application, the state can be en-forced later when the idle or widget screen regains focus. Thus, when the user quits the current application, the user will find the idle/widget screen automatically displaying contextually relevant content (570, 580).

Furthermore, not only is the last-known contextual state persisted but also one can maintain some level of at least one of recent activity, recent context history, or historical patterns for at least one device. The context history is tunable because it could set to a desired duration. The contextual history allows the use of history information to prioritize content retrieval for channels that are likely to be of more interest to the user in the short term like for example brings up the events channel if the user just finished playing a Jazz song, if it is aware of a Jazz event item in that channel. As a result, the user continues to be engaged with the ambient information display increasing the opportunities for other information to be viewed serendipitously.

The context framework 500 employs a broadcast mechanism 560 for sharing the context information with other devices.

Figure 6:
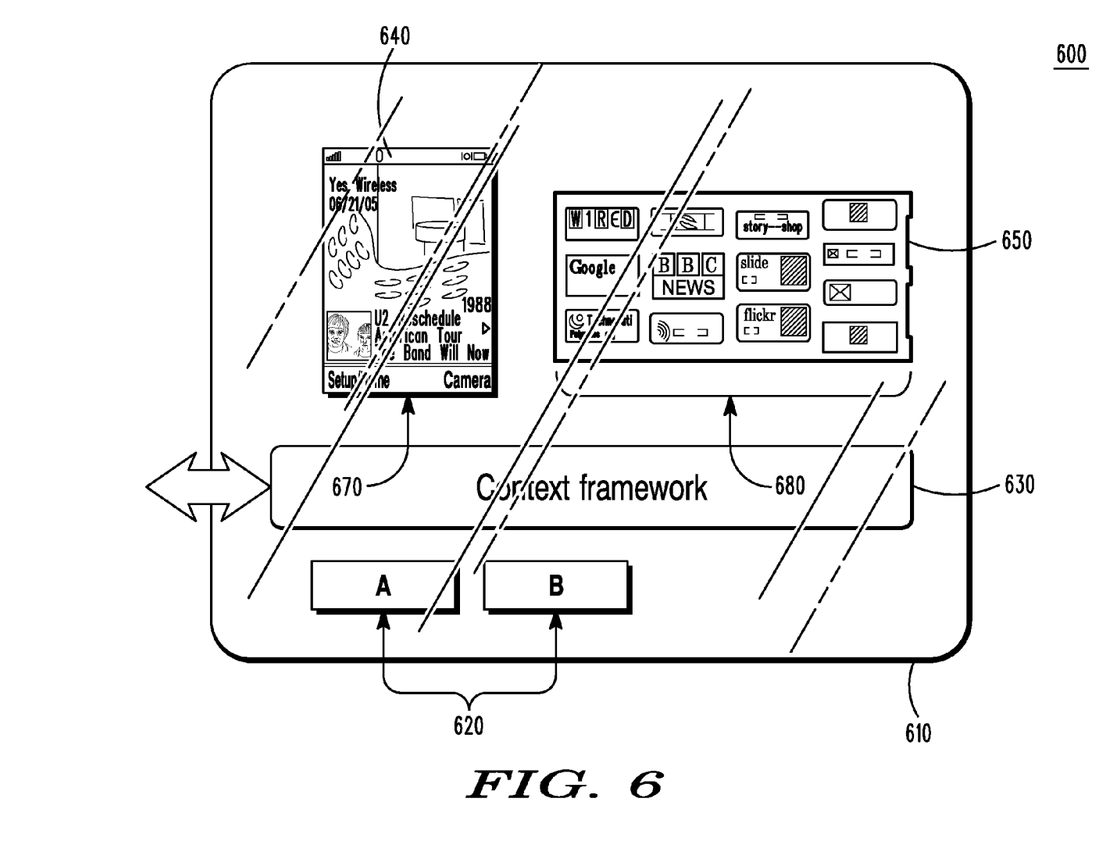
FIG. 6 illustrates a block diagram for implementing a serial or parallel consumption model in other devices in accordance with a possible embodiment of the invention.

FIG. 6 is a representation of the context framework 600 in other devices such as set-top box, personal computer, or television set. The context framework 600 comprises a device 610 such as a set-top box, personal computer, television, or gaming console. Further, the context framework 600 comprises a context source 620 such as from program guide and recorded content, a context framework bus 630 operating under the same principle as bus 520, serial consumption model 640, parallel consumption model 650, content selection (select/highlight) 670 for a serial consumption model, and content selection (hide/reveal) 680 for a parallel consumption model.

Figure 7:
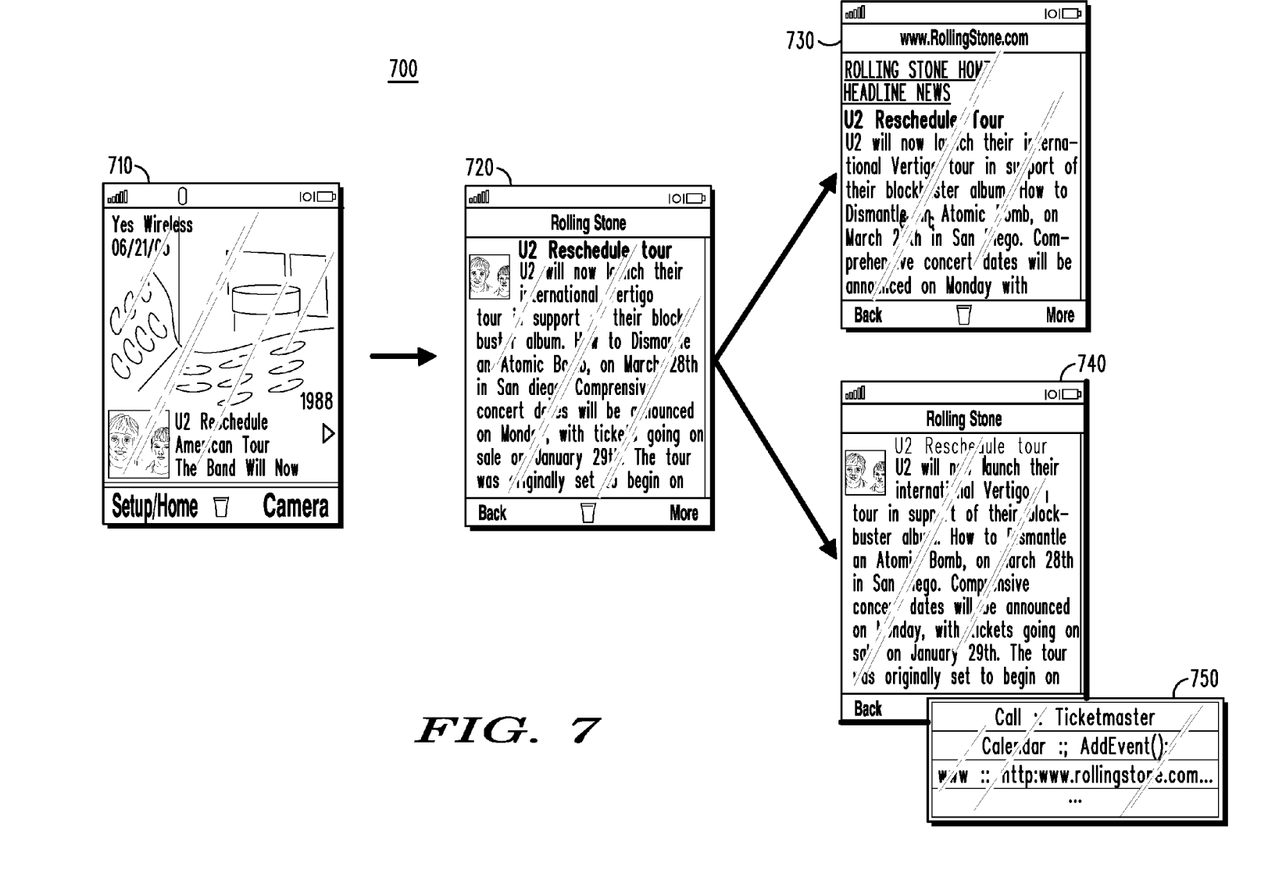
FIG. 7 illustrates a serial consumption model launching an application in accordance with a possible embodiment of the invention.

FIG. 7 is a representation 700 of the serial consumption model illustrating the bites, meals, and further action. The representation 700 shows the serial consumption model (SCREEN 3) from a bite 710 to a snack 720 to a meal 740. The process begins with the selected headline 710 about a musical group rescheduling a musical tour. The headline 710 is the bite. If the user selects the headline 710, the headline is expanded with additional information such as an excerpt summarizing the headline 710. This excerpt 720 is known as a snack. The user can select to have the meal by interacting with the snack. The meal as shown in 730 is simply to launch the browser and go to the source article. While at the source article, the user can request the complete article. This is called a feast since the user is allowed to consume the complete article. The meal can be augmented with context information. Instead of only requesting the source article context information could be used to engage an action launch 750 via custom, dynamically generated menu of user actionable tasks, sorted by priority and relevant context. The context framework bus (520, 630) can enable a multiplicity of user actionable tasks such forms, broadcasting context information, making reservations, updating a calendar, making a telecommunication call, initiating a connection with a wireless network, and any other application that can be programmed or added to a programmed processing device. For example, in the case where the user chooses to interact with a headline about a musical group the user may be given the choice of calling Ticketmaster or other retailers to purchase a ticket for the concert, add an entry for the concert in their calendar, launch the browser and go to the source article. In gaming, context-aware ambient display can help alleviate the awareness problem by using a gameplay context to drive user awareness of other related games (e.g., in the same genre) or can actually recommend games that the user owns but has not played in a while. In Mobile Advertising, SCREEN3 has often been cited as a delivery channel for advertisements. The context-aware ambient display would enable the selection of the right advertisement for display to the user at a given time thus increasing the chances of a click-through. In Mobile Music SCREEN3 has also been cited as a delivery channel for community-based ambient information such as music presence. It is also being used in the Liquid Music context to display related event information (e.g., concerts in your area) via SCREEN3. This context-aware ambient display will ensure that the related channels are displayed to the user at relevant times e.g., brings up the events channel if the user just finished playing a Jazz song, if it is aware of a Jazz event item in that channel.

Figure 8:
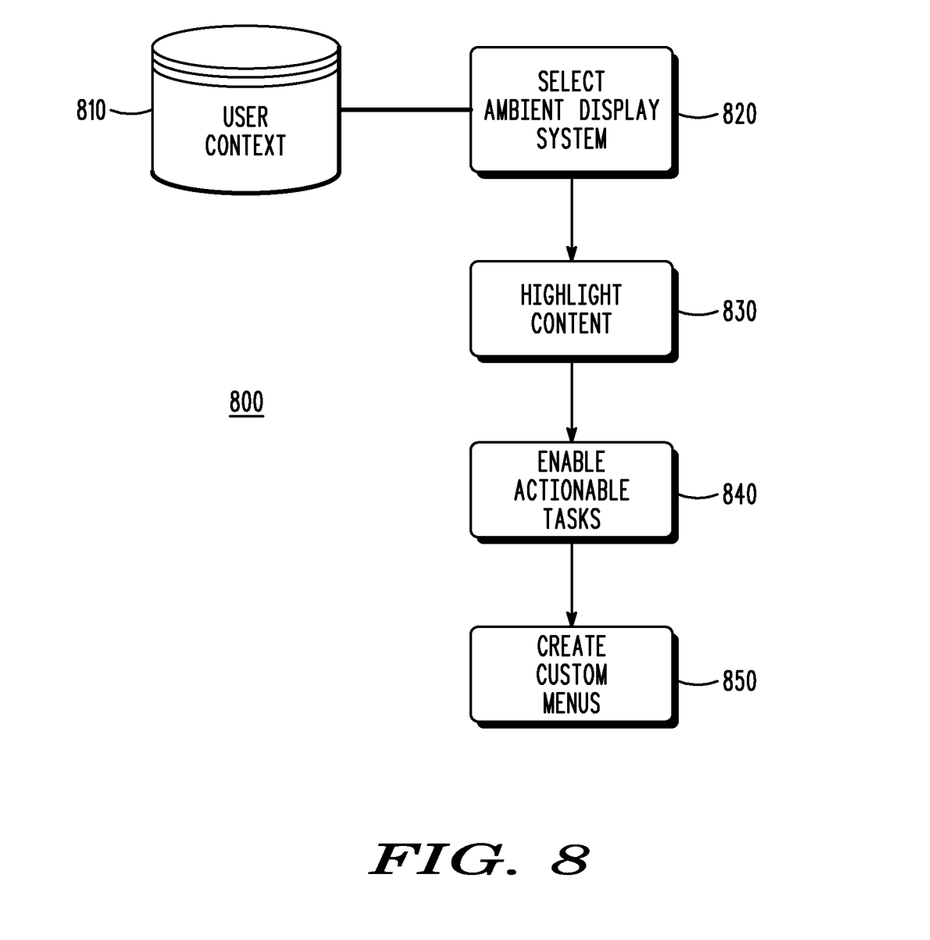
FIG. 8 is an exemplary flowchart illustrating one possible process for creating context-aware ambient display systems in accordance with one possible embodiment of the invention.

FIG. 8 is a flowchart of process 800, a method of creating context-aware ambient display systems in accordance to a possible embodiment. Method 800 begins with action 820 which perform the selection of ambient display systems whereby the context of user activity 810 is used to tailor the ambient information system. User context 620 comprises short-term context or recent activity and long-term context or historical patterns to highlight specific content 830 (channels, widgets) that are likely to be of most immediate interest to the user. This highlighting of relevant content 830 can be done in a manner that maintains the user experience. For instance, context is used to reposition the current carousel pointer in a serial consumption interface such that the user immediately sees the item that was most relevant to his most recent activity. Alternatively, context is used to automate the hide and reveal transition for specific widgets that are most relevant to user activity and potentially automate the reveal and hide transition of irrelevant or stale information widgets. As a result, the user may install and activate many widgets but have only a subset are revealed at any time thus reducing desktop clutter. After the content has been highlighted 830, the method enables actionable tasks 840 such as launching a browser with expanded content, dynamically generated menu 850 of user actionable tasks sorted by priority and relevant context. method 800 operates in the background to display the right information to the user at the right time to achieve impact, where "time" can be an absolute time (based on user history of information access—e.g., user always reads the news on his commute to work) or time can refer to contextually-relevant time based on recent user activity—e.g., when user quits a game, show him items corresponding to other games available at the carrier). In other embodiments, method 800 is implemented as a computer-accessible medium having executable instructions capable of directing a processor, such as processor 330 in FIG. 3, to perform the respective method. In varying embodiments, the medium is a magnetic medium, an electronic medium, or an optical medium.

Figure 9:
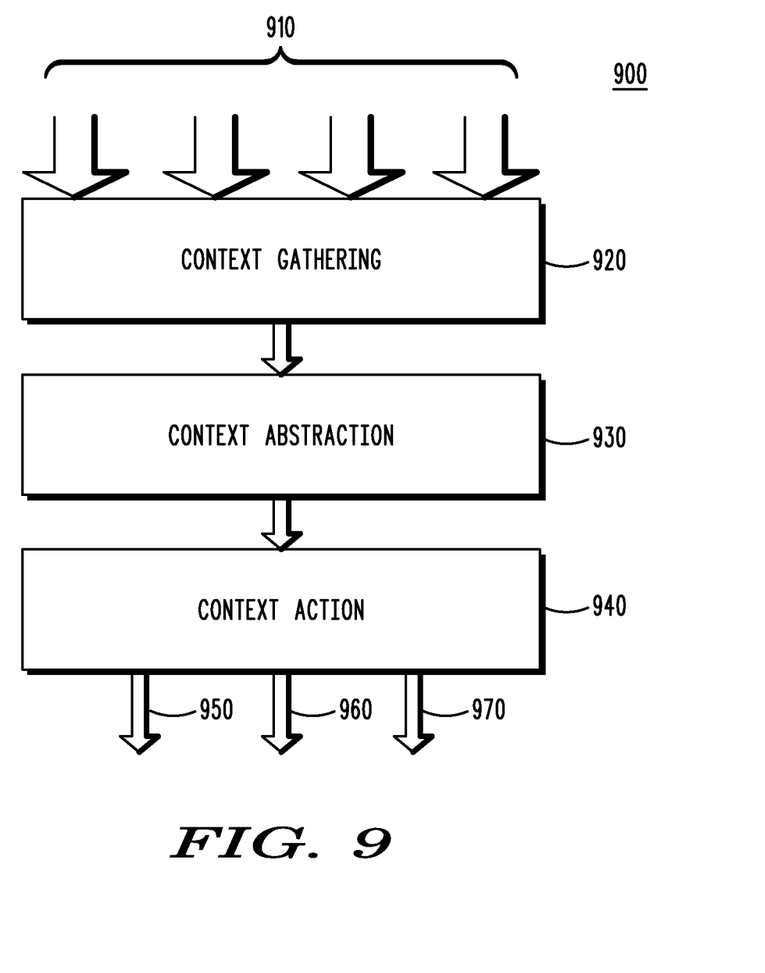
FIG. 9 illustrates a framework for content gathering and content action in accordance with a possible embodiment of the invention.

FIG. 9 is a representation of the layers of a context-aware ambient display system 900 in accordance to a possible embodiment. The layers comprise the inputs, context gathering 920, content abstraction 930, content action, and actions 950, 960, 970 for creating context-aware ambient display systems. The first layer consist of contextual inputs 910 such as from media player, telephony, web browser, set top box, personal computer, television set, entertainment center, gaming system, location, identity, and time and activity. In the context gathering 920 layer, the contextual inputs are transformed, aggregated, and interpreted. In layer 930, the gathered context information is then abstracted to produce a context representation. In layer 940, the context representation is employed to trigger the context-aware ambient display systems. The first trigger 950, second trigger 960, third trigger 970 can be one or more of the following: selected and highlight, select and highlight, generate menu of user-actionable tasks, launch an application such as a calendar or browser, and broadcast context information to other devices.

The context-aware ambient display systems can in the mobile gaming community provide awareness and channel enhancements. Awareness is the long tail of content in that the users often do not play games either because they are not aware that the games exist or are not able to find the right games for their taste. The channel problem exacerbates the awareness problem by limiting the number of conduits through which users can discover and purchase game content—for instance, most carriers allow for purchases from an operator-controlled game deck that lists available games. However, because users typically don't scroll through more than a couple of screens, and because carriers tend to populate the top of the deck with choices that reflect aggregate tastes—this often results in users walking away without discovering and buying a game of interest. The context-aware ambient display as described can help alleviate the awareness problem by using a game-play context to drive user awareness of other related games (e.g., in the same genre) or can actually recommend games that the user owns but has not played in a while (e.g., remind the user of games in that genre that the user owns but hasn't played). In mobile advertising, the context-aware ambient display system would enable the selection of the right advertisement for display to the user at a given time; thus, increasing the chances of a click-through. In mobile music, SCREEN3 is used as a delivery channel for community-based ambient information such as music presence. In the Liquid Music con text to display related event information (e.g., concerts in your area) via SCREEN3. This The context-aware ambient display will ensure that the related channels are displayed to the user at relevant times—e.g., brings up the events channel if the user just finished playing a Jazz song, if it is aware of a Jazz event item in that channel.

Embodiments may also be practiced in distributed computing environments where tasks are performed by local and remote processing devices that are linked (either by hardwired links, wireless links, or by a combination thereof through a communications network. In a distributed computing environment, program modules may be located in both local and remote memory storage devices.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the invention are part of the scope of this invention. For example, the principles of the invention may be applied to each individual user where each user may individually deploy such a system. This enables each user to utilize the benefits of the invention even if any one of the large number of possible applications do not need the functionality described herein. In other words, there may be multiple instances of the context-aware ambient display systems each processing the content in various possible ways. It does not necessarily need to be one system used by all end users. Accordingly, the appended claims and their legal equivalents should only define the invention, rather than any specific examples given.

We claim:

1. A method comprising:
    gathering user context information at a context source;
    registering an ambient display application to notify the ambient display application of the user context information from the context source;
    determining a current user context, where a current user context includes at least one of a current user location, a current time, and a current user activity;
    ascertaining a user interest metric of the user based on historical user patterns; and
    selecting whether or not to display notification content in an ambient display on a display device via at least one of a serial consumption model and a parallel consumption model based on the current user context and based on the user interest metric to highlight specific content that is likely to be of most immediate interest to the user, where the ambient display passively displays the notification content without requiring user input,
    wherein a serial consumption model displays a plurality of information items in sequence and a parallel consumption model displays a plurality of information items concurrently.

2. The method of claim 1, wherein the step of determining a current context comprises the step of determining a last media item consumed and wherein the step of selecting whether to display content is based on the last media item consumed.

3. The method of claim 2, wherein the display device comprises one or more mobile device, a set top box, a desktop PC, and a digital picture frame.

4. The method of claim 3 wherein:
    the parallel consumption model involves the concurrent display of multiple widgets on a device; and
    the serial consumption model involves a carousel display with multiple channels or content items, with only some subset of channels or content items visible at a given time.

5. The method of claim 4, wherein the display device dynamically generates or fetches specific content according to a required further user input and user context information.

6. The method of claim 5 further comprising the step of:
    launching an application based on the user input and the user context information.

7. The method of claim 1 further comprising the step of:
    broadcasting user context information to other devices so to influence the ambient information systems on the other devices.

8. The method according to claim 1, further comprising:
    enabling a user actionable task corresponding to the notification content;
    receiving user input corresponding to the actionable task;
    retrieving additional content in response to receiving the user input corresponding to the actionable task; and
    providing the additional content corresponding to the notification content to the user after retrieving the additional content.

9. An apparatus comprising:
    a display;
    a processor coupled to the display;
    software means operative on the processor for:
    gathering user context information at a context source;
    registering an ambient display application to notify the ambient display application of the user context information from the context source;
    determining a current user context based on the user context information, where a current user context includes at least one of a current user location, a current time, and a current user activity;
    determining a user interest metric of the user based on historical user patterns; and selecting whether or not to display notification content in an ambient display on a display device via at least one of a serial consumption model and a parallel consumption model based on the current user context and based on the user interest metric to highlight specific content that is likely to be of most immediate interest to the user, where the ambient display passively displays the notification content without requiring user input, wherein a serial consumption model displays information items in sequence, and a parallel consumption model displays information items concurrently.

10. The apparatus of claim 9, wherein determining a current context comprises determining a last media item consumed and wherein selecting whether or not to display content is based on the last media item consumed.

11. The apparatus of claim 10, wherein the apparatus comprises one or more mobile device, a set top box, a desktop PC, and a digital picture frame.

12. The apparatus of claim 11 wherein:
the parallel consumption model involves the concurrent display of multiple widgets on a device; and
the serial consumption model involves a carousel display with multiple channels or content items, with only some subset of channels or content items visible at a given time.

13. The apparatus of claim 12, wherein the display device dynamically generates or fetches specific content according to a required further user input and user context information.

14. The apparatus of claim 13, wherein the software means further operates launch an application based on the user input and the user context information.

15. The apparatus of claim 9, wherein the software means further operates to broadcast user context information to other devices so to influence the ambient information systems on the other devices.

* * * * *